United States Patent Office 3,535,142
Patented Oct. 20, 1970

3,535,142
POLYMER SOLUTION COMPOSITIONS AND
METHOD OF UTILIZING THE SAME TO
CONTROL RESIN DEPOSITION
Arthur H. Drelich, Plainfield, and Peter N. Britton, Scotch
Plains, N.J., assignors to Johnson & Johnson, a corporation of New Jersey
No Drawing. Filed Aug. 23, 1967, Ser. No. 663,200
Int. Cl. B32b 27/30; B44d 1/092
U.S. Cl. 117—56                                10 Claims

ABSTRACT OF THE DISCLOSURE

A new method of controlling the deposition of a synthetic resin on a porous substrate by applying to the porous substrate a composition of a synthetic resin, and particularly a vinyl resin, dissolved in a water miscible solvent or solvent mixture, and particularly an alcohol-water mixture, the application of the synthetic resin taking place in the presence of excess water, whereby the synthetic resin is substantially immediately precipitated and deposited on the porous substrate in a controlled manner.

---

This invention relates to a method for controlling the deposition of a synthetic resin on other materials, notably porous substrates, utilizing solutions of the synthetic resin in water miscible solvents or solvent mixtures which are applied to the porous substrate materials in the presence of an excess of water.

Polymer solutions and dispersions are widely used throughout many industries. They have found use in the coating industries for the coating of woven fabrics, paper, and other materials, and are also used as adhesives, for laminating materials, and for bonding fibrous webs. These resins have also found wide use as additives in the manufacture of paper, in the printing industry, and for the decorative printing of textiles.

Commercially, polymers are widely used in the form of resin dispersions, (also called synthetic latices), i.e., aqueous dispersions of emulsion polymerized polymers. In most instances, when the aqueous resin dispersions are applied to a porous substrate, the resin particles are carried by the water until the water is driven off. If it is desired to place the resin on the surface of porous or absorbent sheet material, the material tends to absorb the water and carry the resin into the material rather than depositing the resin merely on the surface. If such resins are used in bonding nonwoven fabrics, especially in pattern bonding, the water tends to wick along the fibers and carry the resin particles with it. Although placed in a specific pattern, the resin will spread due to diffusion of the water and resin, until the water is driven off.

We have now discovered a method for depositing resin or polymer on a material in a closely controlled manner, so that the resin may be placed accurately in or on the material. The control of the resin deposition is accomplished by dissolving the resin in a water miscible solvent and by incorporating excess water in and/or on the surface of the material to which the resin is applied so that when the resin solution is applied to the material, the water of the material, and the solvent containing the resin, intermingle causing the polymer to deposit in place with unexpectedly good control of the precise location of the polymer, and with unexpectedly good film formation of polymer. There should be large amounts of water present when the solution is deposited to provide rapid precipitation and deposition of the polymer, i.e., preferably amounts of water of approximately the same order of magnitude as the amount of solvent present. Surprisingly these amounts of water do not harm the polymer; i.e., cause gelling and flocculation, but unexpectedly the film forming properties and the strength characteristics of the polymer film formed are maintained by utilizing our new method of polymer deposition.

The polymers which may be used in accordance with the invention are the vinyl resins which have a substituent group selected from the class of acetates, acrylic esters and chlorides which usually have a molecular weight of 500,000 or more and may be divided into two major categories. First, there are those polymers which were polymerized in emulsion form, and are commonly available in aqueous dispersions. These dispersions, commonly called resins or latices, are generally produced by emulsifying the monomers, stabilizing the emulsion by various surfactant systems and then polymerizing the monomers in the emulsified state to form a solid resin or polymer. In these resins the solid polymer is dispersed in an aqueous medium as discrete particles of colloidal dimensions (1 to 2 microns diameter or smaller). In order to use these latices in this invention, they must be converted into solutions by the addition, with gentle mixing, of water miscible solvents, such as the lower aliphatic alcohol and ketones. The working solutions of resin contain an appreciable proportion of water, ranging from about 15% to 40% water content by weight. It is generally characteristic of emulsion polymers to have high molecular weights, hence the upper range of solids content in the solution is limited by practical working viscosities. The usual chemical categories of latices which may be employed include polyvinyl acetates and polyacrylates, as homopolymers and copolymers and in the non-reactive as well as the reactive (or self-crosslinking) modifications. Other latices which form solutions upon the controlled addition of the above solvents may also be used. The polyvinyl chlorides and synthetic and natural rubbers are in general unsuited for this invention.

The second category includes those polymers which are commonly available in dry or bulk form and which can be dissolved in organic solvents miscible in water, and which polymers are not themselves soluble in water. Many solvent-polymer combinations fulfill these requirements and may be used. One group of water miscible solvents is characterized by low molecular weights, low boiling temperatures, and high polarity, and includes alcohols, ketones, and organic acids. These solvents are effective for acrylates, polyvinyl acetates, polyvinyl chlorides, cellulosics and others. A second group of water-miscible solvents is in a higher molecular weight range, boils at higher temperatures, is also strongly polar, and is especially noteworthy in its ability to disrupt hydrogen bonding in otherwise difficult soluble polymers. The latter group of water miscible solvents includes dimethyl sulfoxide, N - methyl pyrrolidone, trifluoroethanol and gamma butyrolactone. These liquids are effective solvents for certain nylons, acrylonitriles, and even some linear polyesters. In general, these latter solutions are intolerant of water; hence must be prepared without addition of water in the solution formulation. In carrying out the process of applying such a polymer solution to an absorbent material containing water, as the water diffuses into the polymer solution the polymer is precipitated in and on the material under unexpectedly close geometric spatial control and in an unexpectedly continuous film.

In carrying out this invention with a polymer which was originally polymerized as a latex, the polymer is dissolved in a mixture of water and a water miscible solvent such as an alcohol. The final solution comprises from about 0.1% to 25% by weight of resin solids dissolved in the alcohol-water mixture. The alcohol-water mixture contains from about 60% to 85% of a water miscible alcohol such as methyl, ethyl, normal propyl, or isopropyl alcohol. The remainder of the solution is water. Other alcohols such as terahydrofurfuryl alcohol, and in fact certain ketones such as acetone or methyl ethyl ketone which are very soluble in water may also be used to convert the resin dispersion into a solution.

In our method, when we utilize polymers which are commonly available in dry or bulk form, the polymer is dissolved in an appropriate water miscible solvent using well-known methods. These polymers, which have been prepared by well-known polymerization or polycondensation methods, in bulk, in the vapor phase, in solution, by interfacial polymerization, as well as by other methods known in the art may be utilized so long as they are soluble in a water miscible solvent, but not soluble in water itself. Typical polymers and water miscible solvent combinations include polyacrylonitrile in dimethylsulfoxide, cellulose acetate in acetone, nylon in N-methyl pyrrolidone, polyvinyl chloride in N-methyl pyrrolidone, polyvinyl butyral in gamma butyrolactone, polyvinyl acetate in isopropyl alcohol. Methods for preparing these solutions are well-known and require no elaboration.

The solvents used in accordance with the present invention are miscible with the excess water present in the material and diffuse throughout the material while simultaneously the polymer solids are precipitated by the excess water under unexpectedly close control of their location in and/or on the material, and in the form of unexpectedly continuous polymer films. The excess water present in the material should be sufficient to cause precipitation of the polymer solids almost immediately upon contact between the polymer solution and the water. Amounts of water of the same order of magnitude as the amount of the solvent have been found satisfactory for accomplishing such immediate precipitation of polymers from most water miscible solvents. The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE I

A web of 100% rayon fibers, 1½ denier and 1½ inch in length is print bonded by the rotogravure process using an engraved roll having six horizontal wavy lines per inch. The width of each line in the engraved roll is about 0.018 inch. The composition of the resin solution used for the print bonding is:

| | Percent |
|---|---|
| Self cross-linking acrylic polymer predominately polyethyl acrylate polymerized with an anionic surfactant system | 12 |
| Ammonium chloride catalyst | 0.2 |
| Anti-foaming agent | 0.2 |
| Isopropyl alcohol | 66 |
| Water | 21.4 |
| Blue pigment | 0.2 |

In formulating the solution, the aqueous resin dispersion of about 50% solids is dissolved by slowly adding the calculated amount of an aqueous-alcohol mixture of about 87% alcohol, with gentle stirring.

The rayon web is passed through a water-immersed mangle and the binder printed onto the wet web. The web contains about 175% water based on the weight of the (dry) fibers. The resin precipitates instantly, fixing the resin in place with minimal lateral spread. The printed web is dried and cured. The resultant fabric weighs about 250 grains per square yard.

A swatch of the resultant fabric is stained with a differential dye to accurately determine the location of the binder stripes. Each binder stripe has a width of about .030 inch. The tensile strength of the fabric is about 1.5 pounds per 100 grain weight in the long direction and 0.15 pounds per 100 grain weight in the cross direction. The fabric is very soft.

EXAMPLE II

A second fabric is made as described in conjunction with Example I with the following differences:

(1) the isopropyl alcohol is replaced with water,
(2) 4 lines per inch instead of 6 lines per inch are used in the print-bonding pattern.

A swatch of the resultant fabric is stained to determine binder stripe width which is about 0.160 inch. The softness of the fabric is still good. The long tensile strength is about 1.5 pounds per 100 grain weight and the cross-tensile strength is about 0.10 pounds per 100 grain weight.

EXAMPLE III

A web of 100% rayon fibers, 1½ denier and 1½ inch in length, weighing about 400 grains per square yard is print bonded with a 15% solution of a polyvinyl acetate resin polymer dissolved in N-methyl pyrrolidone. The print pattern used is six (6) parallel wavy lines per inch with each engraved line having a width of approximately 0.024 inch. When the binder solution is applied to the web the web contains approximately 200% water. The web with the binder thereon is dried and steam heated metal cans to produce a strong, soft and absorbent nonwoven fabric.

A piece of the resultant fabric is stained with a differential dye to determine the location of the binder stripes. Each binder stripe has a width of from about 0.033 inch to 0.036 inch or an increase in width of from about 37.5% to 50%. The softness of the fabric as measured on a Gurley Softness Tester is determined to be 3.9 mg. in the machine direction and 2.8 mg. in the cross direction.

EXAMPLE IV

The procedures as outlined in Example III are followed as outlined therein with the exception that in this example a polyvinyl acetate polymer dispersion of 50% polyvinyl acetate polymer dispersed in water is substituted for the binder solution used in Example III.

The resultant fabric is dyed to determine location of binder stripes. Each binder stripe has a width of from about 0.103 inch to 0.135 inch or an increase of 320% to 460%. The softness of this fabric as measured on the Gurley Softness Tester is determined to be 31.3 mg. in the machine direction and 14.3 mg. in the cross direction.

Having now described the invention in specific detail and exemplified the manner in which it may be carried into practice, it will be readily apparent to those skilled in the art that innumerable variations, applications, modifications, and extensions of the basic principles involved may be made without departing from its spirit and scope.

We claim:

1. A method of applying a synthetic resin to porous substrates comprising, dissolving the synthetic resin in a water miscible solvent or solvent mixture to form a solution of the synthetic resin applying excess water to the porous substrate in an amount which will precipitate said resin thereon then applying the synthetic resin solution to the porous substrate containing the excess water whereby the synthetic resin is substantially immediately precipitated and is deposited on the porous substrate in a controlled manner, and drying the porous substrate with the synthetic resin deposited thereon.

2. A method according to claim 1 wherein the synthetic resin is an aqueous dispersion of discrete particles of the synthetic resin.

3. A method according to claim 1 wherein the water miscible solvent mixture is a mixture of an alcohol and water.

4. A method according to claim 1 wherein the synthetic resin is an aqueous dispersion of discrete particles of the synthetic resin and the water miscible solvent mixture is a mixture of an alcohol and water.

5. A method according to claim 1 wherein the amount of excess water applied to the porous substrate is greater than the amount of synthetic resin solution applied to said porous substrate.

6. A method according to claim 1 wherein the synthetic resin solution contains from about 0.1% to 25% by weight of the solution of the synthetic resin.

7. A method according to claim 1 wherein the synthetic resin is a polyvinyl acetate resin.

8. A method according to claim 1 wherein the synthetic resin is a vinyl resin containing acrylic ester groups.

9. A method according to claim 1 wherein the solvent is N-methyl pyrrolidone.

10. A method according to claim 3 wherein the alcohol is isopropyl alcohol.

References Cited

UNITED STATES PATENTS

| | | | |
|---|---|---|---|
| 2,424,386 | 7/1947 | Czeczowitzka | 117—56 X |
| 2,715,078 | 8/1955 | Cohen | 117—56 |
| 3,100,721 | 8/1963 | Holden | 117—1610 X |
| 3,190,765 | 6/1965 | Yuan | 117—135.3 X |
| 3,190,766 | 6/1965 | Yuan | 117—63 |
| 3,238,055 | 3/1966 | Brightwell | 117—63 X |
| 3,284,274 | 11/1966 | Halslander et al. | 117—135.5 X |
| 3,296,016 | 1/1967 | Murphy | 117—63 X |
| 3,348,963 | 10/1967 | Fukushima et al. | 117—135.5 X |

WILLIAM D. MARTIN, Primary Examiner

M. R. LUSIGNAN, Assistant Examiner

U.S. Cl. X.R.

117—60, 145, 155